United States Patent Office 3,775,457
Patented Nov. 27, 1973

3,775,457
METHOD OF MANUFACTURING ALKOXYSILANES
Hisashi Muraoka, Yokohama, Masafumi Asano, Kawasaki, Taizo Ohashi, Kanagawa-ken, and Hiromi Yoshida, Tokyo, Japan, assignors to Tokyo Shibaura Electric Co., Ltd., Saiwai-ku, Kawasaki-shi, Japan
Filed Sept. 26, 1972, Ser. No. 292,395
Claims priority, application Japan, Sept. 30, 1971, 46/75,792
Int. Cl. C07f 7/04, 7/06
U.S. Cl. 260—448.8 R                 10 Claims

ABSTRACT OF THE DISCLOSURE

A method of manufacturing alkoxysilanes which comprises holding a cuprous chloride catalyst and finely divided silicon in a suspended state in a synthetic oil containing multicyclic aromatic hydrocarbons consisting of two to four rings which collectively include one to four alkyl groups each having less than four carbon atoms, adding a material represented by a chemical formula ROH (where R denotes an alkyl group having less than four carbon atoms) to said suspension at a temperature of 100 to 300° C. for reaction with silicon, thereby obtaining alkoxysilanes expressed by a general formula $H_nSi(OR)_{4-n}$ (where $n$ is an integer of 0 to 3).

Figure 1:
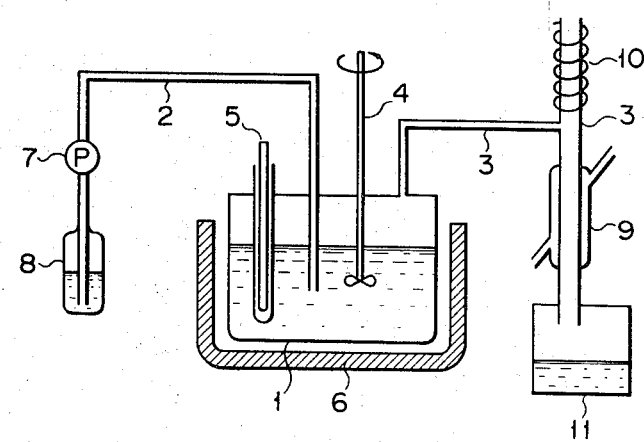

This invention relates to a method of manufacturing alkoxysilanes expressed by a general formula $$HnSi(OR)_{4-n}$$

(where $n$ is an integer of 0 to 3 and R is an alkyl group having less than four carbon atoms) and more particularly to a method of manufacturing triethoxysilane in good yield.

Alkoxysilanes represent a group of important organic silicon compounds like chlorosilanes including, for example, tetrachlorosilane ($SiCl_4$) and trichlorosilane ($SiHCl_3$) which may be expressed by a general formula $SiH_nCl_{4-n}$ (where $n$ is an integer of 0 to 3), and produce a large number of silicon derivatives. For example, triethoxysilane $HSi(OC_2H_5)_3$ is know to produce silane ($SiH_4$) and tetraethoxysilane $Si(OC_2H_5)_4$ by the under mentioned reaction in the presence of sodium as a catalyst:

$$4HSi(OC_2H_5)_3 \xrightarrow{Na} SiH_4 + 3Si(OC_2H_5)_4$$

Since silane is used in quantities in the semiconductor industry, it will offer great advantage if there can be obtained at low cost high purity triethoxysilane from which the aforesaid silane is manufactured.

The conventional method of manufacturing alkoxysilanes which consists in reacting $SiCl_4$, $SiHCl_3$ or $SiH_2Cl_2$ with alcohol is accepted widely on an industrial scale. Where, however, triethoxysilane is produced by this method, there is also generated tetraethoxysilane equimolar to said triethoxysilane, as seen from the following reaction formula:

$$2SiHCl_3 + 7C_2H_5OH \rightarrow (C_2H_5O)_3SiH + (C_2H_5O)_4Si + 6HCl + H_2$$

Therefore, it is practically necessary to employ an additional process of separating both types of ehtoxysilanes. Further, the above reaction naturally leads to the evolution of hydrogen chloride as a reaction byproduct. Since this hydrogen chloride is very corrosive, the above-mentioned method has the drawback that a plant manufacturing triethoxysilane according to said method should be constructed of corrosion-resistant material. Further, the trichlorosilane ($SiHCl_3$) of the above reaction formula from which there is derived triethoxysilane is readily subject to hydrolysis to release hydrogen chloride, presenting great difficulties in handling. Moreover, the high cost of said trichlorosilane necessarily renders the resultant product of alkoxysilanes including triethoxysilane expensive.

Another known method of manufacturing alkoxysilanes consists in directly reacting metallic silicon with alcohol using copper as a catalyst. For this method, there are adopted various types of catalytic system consisting of copper as a catalyst and raw silicon in order to accelerate reaction. One of said catalytic systems is prepared by sintering silicon with copper as a catalyst. All these catalytic systems are prepared by a complicated and time-consuming process. Further the above-mentioned method of manufacturing alkoxysilanes by reacting metallic silicon with alcohol results in a low yield. Following is the reason. Where the metallic silicon is reacted with alcohol, there simultaneously take place the following four different reactions denoted by (a), (b), (c) and (d):

(a)  $4C_2H_5OH + Si \rightarrow (C_2H_5O_4Si + 2H_2$
(b)  $3C_2H_5OH + Si \rightarrow (C_2H_5O)_3SiH + H_2$
(c)  $2C_2H_5OH + Si \rightarrow (C_2H_5O)_2SiH_2$
(d)  $2C_2H_5OH + Si \rightarrow SiO_2 + 2C_2H_6$ These reactions are all exothermic, so that where there is used the prior art catalytic system consisting of metallic silicon sintered with copper, the local generation of great heat is unavoidable. This often leads to the occurrence of the aforesaid (d) type of reaction. The growth of $SiO_2$ in said (d) reaction means loss of raw silicon and necessarily results in a low yield of alkoxysilanes.

It is accordingly the object of this invention to provide a method of manufacturing in good yield and at low cost high purity alkoxysilanes expressed by a general formula $H_nSi(OR)_{4-n}$ (where R is an alkyl group having less than four carbon atoms and $n$ is an integer of 0 to 3).

The method of this invention generally consists in holding a catalyst and finely divided silicon in a suspended state in a synthetic oil containing multicyclic aromatic hydrocarbons consisting of two to four rings which collectively include one to four alkyl groups each having less than four carbon atoms; and adding a material represented by a chemical formula ROH (where R is an alkyl group having less than four carbon atoms) to said suspension at a temperature of 100 to 300° C. to react the silicon with said ROH material. Among the alkoxysilanes obtained by the method of this invention, triethoxysilane $HSi(OC_2H_5)_3$ is very useful as a raw material for silane used in the semiconductor industry.

Figure 2:
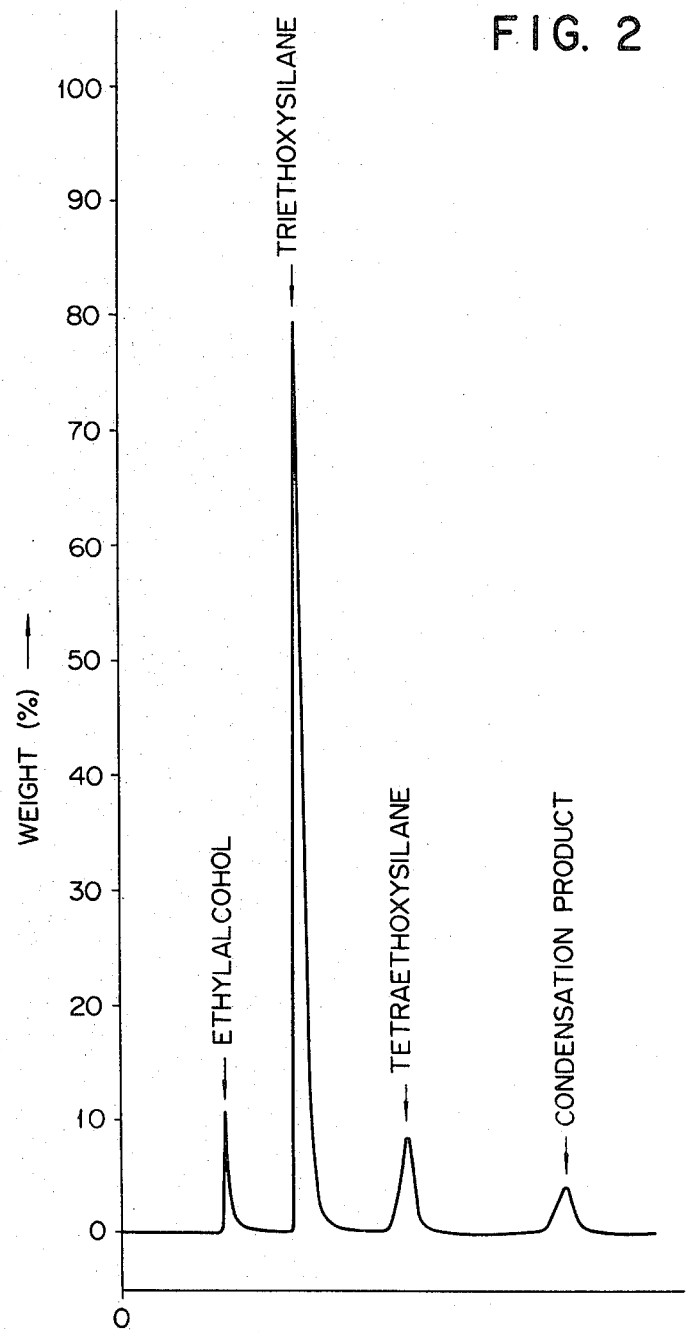

The present invention can be more fully understood from the following detailed description when taken in connection with reference to the accompanying drawings, in which:

FIG. 1 is a schematic illustration of alkoxysilanes manufacturing apparatus; and FIG. 2 is a gas chromatogram of reaction products obtained by the method of the invention.

The synthetic oil used in this invention to hold a catalyst and finely divided silicon in a suspended state therein is a novel type, that is, a mixture containing multicyclic aromatic hydrocarbons consisting of two to four rings which collectively include one to four alkyl groups each having less than four carbon atoms. Said mixture is prepared by catalytically hydrotreating a heavy tarry substance obtained after cracking a mineral oil at a higher temperature than 1000° C., followed by alkylation and thereafter collecting distillates having a boiling point of 280 to 450° C. Said mixture contains at least one of four different multicyclic aromatic hydrocarbons bearing the following structural formulas:

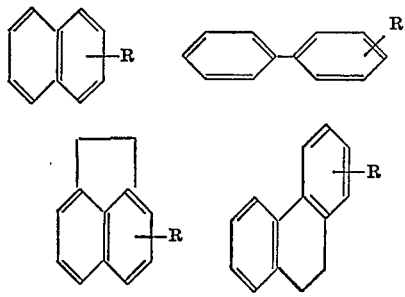

where R is an alkyl group having less than four carbon atoms.

When determination was made of the properties of a sample of the synthetic oil used in this invention, the following data were obtained.

Density ($d^{15}$) _____ 0.95 to 1.00
Refractive index ($n_D^{25}$) _____ 1.54 to 1.58
Pour point (° C.) _____ $<-27.5$
Viscosity (cst.) _____ 10 to 45 (30° C.)
Sulfur content (percent) _____ 0.002
Heat conductivity (Kcal./n.
  AK° C.) _____ 0.09 (200° C.)

The above-mentioned novel synthetic oil used in this invention enables a catalyst and finely divided silicon to be uniformly dispersed in a reaction system, preventing the local generation of great heat in the reaction system and equalizing the temperature thereof. Therefore, within the range of 100 to 300° C. in which alkoxysilanes are produced, it is possible to suppress the growth of $SiO_2$ resulting from oxidation of silicon powders. No formation of $SiO_2$ means that raw silicon can be used without loss in producing alkoxysilanes, naturally attaining its high yield.

The aforesaid synthetic oil has sufficient resistance to heat and chemicals to be saved from decomposition at the temperature of 100 to 300° C. at which alkoxysilanes are grown. Said oil has the same degree of heat conductivity as an ordinary heating medium, offering the advantage of being usable as a heating medium. The oil has further advantage that it is substantially free from impurities containing oxygen, nitrogen or sulfur. For example, the oil contains extremely minute amounts, as 0.001 to 0.005 percent by weight of sulfur which is most difficult to eliminate and exerts a harmful action on a copper catalyst and 0.0003 to 0.001 percent by weight of nitrogen. Another prominent merit of said synthetic oil is that it allows an inorganic copper compound such as cuprous chloride or an organic copper compound such as copper acetate to be used alone. This saves troublesome work such as preparing a catalytic system by sintering a copper catalyst with silicon as is often practised in the conventional method of manufacturing alkoxysilanes, thus offering a prominent advantage. Particularly preferable is cuprous chloride for the method of this invention. It has also been confirmed that where the reaction of forming alkoxysilanes slows down, addition of ammonium chloride restores said reaction.

There will now be explained by reference to FIG. 1 the arrangement of the reaction apparatus used in the later described example of this invention as well as in referential experiments falling outside of the scope of the invention. Numeral 1 is a reaction vessel, which is fitted with an alcohol inlet pipe 2, reaction product outlet pipe 3, agitator 4 and thermometer 5. The reaction vessel 1 is maintained at a desired temperature by a heater 6. The alcohol inlet pipe 2 is connected to an alcohol tank 8 through a flow-regulating pump 7. The reaction product outlet pipe 3 is fitted with a water cooler 9 and heater 10 and connected at the lower end to a distillate collector 11. There will now be described the operation of the reaction apparatus of the above-mentioned arrangement. First, the reaction vessel 1 is filled with a solvent (the aforesaid synthetic oil for the method of this invention), silicon powders and catalyst. The charged materials are fully stirred by the agitator 4 and the reaction vessel 1 begins to be heated by the heater 6. When the reaction vessel 1 reaches a tempearture of about 200° C., then an ROH material, for example, ethyl alcohol is introduced into the reaction vessel 1 by the flow-regulating pump 7. Introduction of the ethyl alcohol causes a reaction product to be formed in the reaction vessel 1. The reaction product runs down the reaction product outlet pipe 3 into the distillate collector 11. It has been found that where the synthetic oil of this invention is used as a solvent, the reaction product mostly consists of triethoxysilane. The heater 10 fitted to the reaction product outlet pipe 3 is intended to draw off unreacted alcohol or, for example, water derived from a decomposition reaction expressed by the following formula:

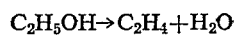

$$C_2H_5OH \rightarrow C_2H_4 + H_2O$$

Where determination is made of fundamental data, for example, the degree of reaction, all the constituents of the reaction product or distillate have to be sampled so that the heater 10 is taken off the reaction product outlet pipe 3.

Where alkoxysilanes are continuously manufactured, a thermocouple (not shown) is inserted into the reaction vessel 1 instead of the thermometer 5 for control of the heater 6 and in consequence the temperature of the reaction vessel 1.

While the composition of the reaction product may be ascertained by infrared spectroscopic analysis, said composition can also be determined by gas chromatography, because the reaction product is easily liquefiied, that is, remains in a liquid state at normal temperature. FIG. 2 illustrates said gas chromatographic analysis conducted by filling the gas chromatographic column with Thermol-3, introducing hydrogen gas thereinto as a carrier and maintaining the column at a temperature of 100° C.

This invention will be more fully understood by reference to the following example.

EXAMPLE

The reaction vessel 1 was charged with 500 cc. of synthetic oil containing multicyclic aromatic hydrocarbons consisting of two to four rings which collectively include one to four alkyl groups each having less than four carbon atoms, 200 g. of silicon powders and 16 g. of cuprous chloride. When the reaction vessel was heated to 200 to 250° C., there was introduced ethyl alcohol containing 0.17% of hydrogen fluoride. The gas chromatographic analysis of the composition of the reaction product showed that triethoxysilane accounted for 73.3 percent by weight and tetraethoxysilane 4.5 percent by weight. As apparent from this result of analysis, the method of this invention is extremely useful for manufactures of triethoxysilane. The synthetic oil was found to be a solvent capable of fully withstanding use in an operation continued over a period of even more than a week. It was further confirmed that where the oxide film generally formed on the surface of silicon powders were washed off with hydrofluoric acid before use, then the yield of triethoxysilane approached 100 percent. Accordingly, the triethoxysilane was easily separated from the other constituents of the reaction product.

Reference 1

The reaction vessel 1 was filled with 200 g. of silicon powders, 500 cc. of ethyl silicate as a solvent, 16 g. of cuprous chloride and 10 g. of acid ammonium fluoride. The charged mass was heated to 200° C. while being stirred. At this time, it was commenced to introduce ethyl alcohol containing 0.5 percent of hydrogen chloride into the reaction vessel 1. Gas chromatography of a trapped reaction product indicated that triethoxysilane only accounted for 9 percent by weight, tetraethoxysilane 12 percent by weight and the remainder was constituted by ethyl alcohol, that is, an extremely low reaction rate of triethoxysilane. Further, reaction was continued only for about 10 hours, because the reaction system was finally solidified, obstructing any further continuation of reaction. Therefore, the solvent of ethyl silicate was found unadapted for manufacture of alkoxysilanes.

The above mentioned ethyl silicate is a mixture mainly consisting of a condensate expressed by the following structural formula:

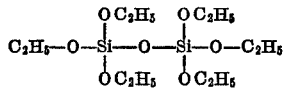

Reference 2

The reaction vessel 1 was filled with 200 g. of silicon powders 500 cc. of fluid paraffin as a solvent and 16 g. of cuprous chloride. When the charged mass was fully heated, there was introduced ethyl alcohol containing 0.2 percent of hydrogen fluoride. Analysis of the reaction product showed that during the peak time of reaction, the distillate contained 40.7 percent by weight of triethoxysilane and 5.2 percent by weight of tetraethoxysilane, said content of 40.7 percent by weight being far smaller than the aforesaid 73.3 wt. percent yield of triethoxysilane attained in the example of this invention.

Reference 3

An experiment was made under substantially the same conditions as in Reference 2, excepting that the fluid paraffin used as a solvent in Reference 2 was replaced by a synthetic oil containing saturated multicyclic hydrocarbons consisting of two-five rings which collectively included 0 to 4 alkyl groups each having less than four carbon atoms. When there was introduced ethyl alcohol, the synthetic oil used as a solvent overflowed from the reaction vessel 1 into the reaction product outlet pipe 3, obstructing the occurrence of a main reaction.

What we claim is:

1. A method of manufacturing alkoxysilanes which comprises holding cuprous chloride as a catalyst and finely divided silicon in a suspended state in a synthetic oil containing multicyclic aromatic hydrocarbons consisting of two to four rings which collectively include one to four alkyl groups each having less than four carbon atoms, adding an alcohol having formula ROH wherein R is an alkyl group having less than four carbon atoms to said suspension at a temperature of 100 to 300° C., thereby producing alkoxysilanes having the formula $H_nSi(OR)_{4-n}$ wherein $n$ is an integer of 0 to 3.

2. A method according to claim 1 wherein the alcohol is ethyl alcohol.

3. A method according to claim 1 wherein the synthetic oil is prepared by catalytically hydrotreating a heavy tarry substance obtained after cracking a mineral oil at a higher temperature than 1000° C., followed by alkylation and thereafter collecting distillates having a boiling point of 280 to 450° C.

4. A method according to claim 3 wherein the synthetic oil contains at least one of four different multicyclic aromatic hydrocarbons having the structural formulas given below:

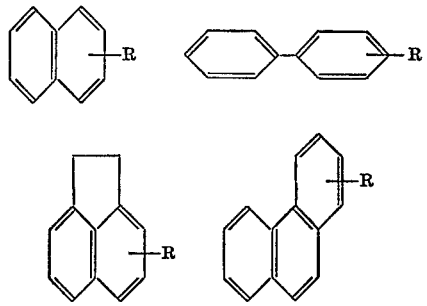

where R is an alkyl group having less than four carbon atoms.

5. A method according to claim 1 wherein there is added ammonium chloride during the progress of reaction.

6. A method according to claim 1 wherein $n$ is 1.

7. A method according to claim 1 wherein $n$ is 2.

8. A method according to claim 4 wherein the alcohol is ethyl alcohol.

9. A method according to claim 8 wherein $n$ is 1.

10. A method according to claim 9 wherein ammonium chloride is added during the progress of the reaction.

References Cited

UNITED STATES PATENTS

| | | | |
|---|---|---|---|
| 3,627,807 | 12/1971 | Bleh et al. | 260—448.8 A |
| 2,927,937 | 3/1960 | Gaines | 260—448.8 A |
| 2,445,576 | 7/1948 | Haber | 260—448.8 A |
| 2,473,260 | 6/1949 | Rochow | 260—448.8 A |
| 2,673,870 | 3/1954 | Johns | 260—448.8 A |
| 3,232,972 | 2/1966 | Beanland | 260—448.8 A |
| 2,389,931 | 11/1945 | Reed et al. | 260—448.8 AX |
| 2,909,550 | 10/1959 | Sperr et al. | 260—448.8 A |

DANIEL E. WYMAN, Primary Examiner

P. F. SHAVER, Assistant Examiner

U.S. Cl. X.R.

260—448.8 A